March 16, 1926. 1,577,419
F. M. CUSHING ET AL
ELECTRIC SPOT WELDING MACHINE
Filed March 12, 1923  2 Sheets-Sheet 1
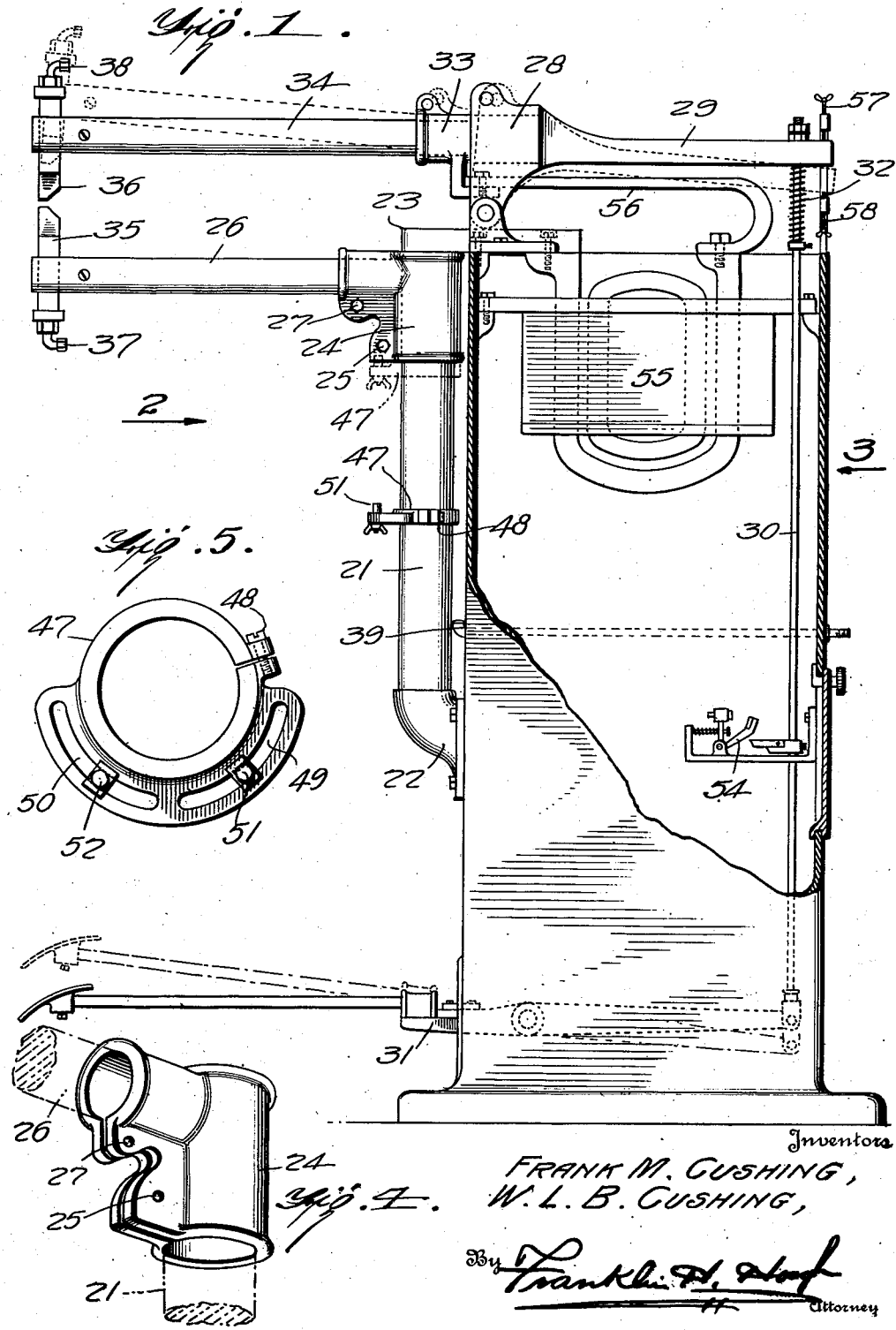
Inventors
FRANK M. CUSHING,
W. L. B. CUSHING,
By Franklin H. Hough
Attorney

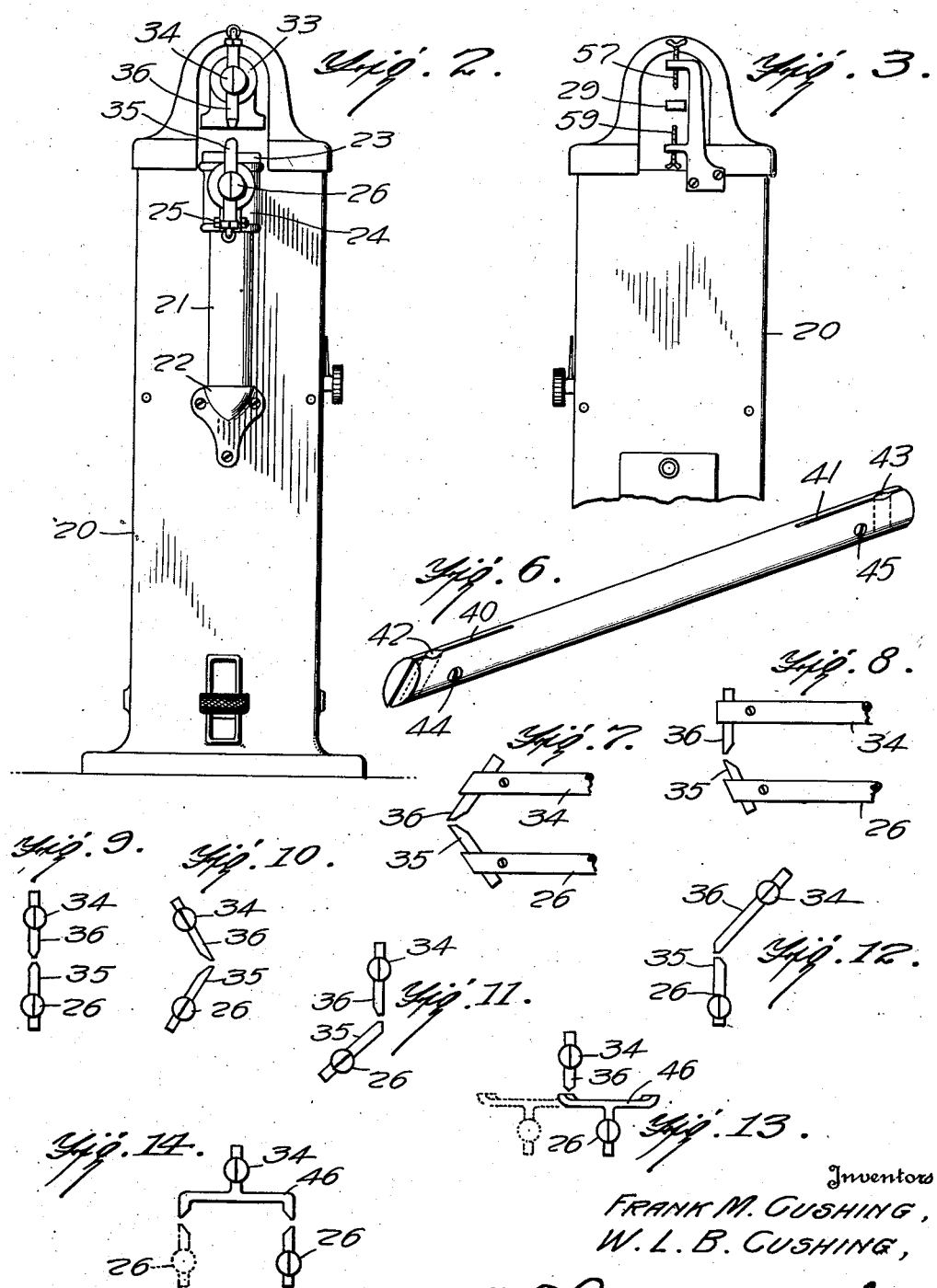

Patented Mar. 16, 1926.

1,577,419

UNITED STATES PATENT OFFICE.

FRANK M. CUSHING AND WILLIAM L. B. CUSHING, OF LOS ANGELES, CALIFORNIA.

ELECTRIC SPOT-WELDING MACHINE.

Application filed March 12, 1923. Serial No. 624,415.

*To all whom it may concern:*

Be it known that we, FRANK M. CUSHING and WILLIAM L. B. CUSHING, citizens of the United States, residing at Los Angeles, in the county of Los Angeles and State of California, have invented certain new and useful Improvements in Electric Spot-Welding Machines; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to spot welding machines and has for an object to provide a machine embodying additional and improved features of convenience and elasticity whereby the device may accomplish a greater number of purposes and operate in a greater number of locations than is usually provided.

A further object of the invention is to provide a spot-welding machine having electrodes which move relative to each other to permit the insertion and withdrawal of the work and also permits the lateral movement of one or both of the electrode-carrying devices for the purpose of reaching positions otherwise unavailable.

A further object of the invention is to provide in a spot welding machine an arm with means for raising and lowering the arm into operative position with the lower arm and with improved means for facilitating the lateral movement of the lower arm relative to the upper arm.

With these and other objects in view the invention comprises certain novel elements, parts, units, combinations, mechanical movements and inter-actions, as disclosed in the drawings, together with mechanical and functional equivalents thereof, as will be hereinafter more fully described and claimed.

In the drawings:

Figure 1 is a view of the spot welding machine partly in side elevation, one part of the housing broken away to show the internal construction;

Figure 2 is a view of the spot welding machine in edge elevation, as indicated by arrow 2 at Figure 1;

Figure 3 is a view of the spot welding machine in edge elevation, as indicated by arrow 3 at Figure 1;

Figure 4 is a sectional perspective detail view of the connection of one of the electrode arms with the housing;

Figure 5 is a plan view of a collar employed as a guide and limiting member for the movable arm;

Figure 6 is a perspective view of one of the arms;

Figures 7 and 8 are respectively views in side elevation of the adjustment of the arms and electrodes relative to each other;

Figures 9 to 14 inclusive are views in end elevation of the relative positions of the arms and electrodes under varying conditions.

Like characters of reference indicate corresponding parts throughout the several views.

The improved spot welding machine which forms the subject matter of this application is designed for spot welding in relatively inaccessible positions, as the bottom of boxes, boilers and the like and provides means for inserting one arm carrying one electrode within such box, or the like, and means for positioning the electrode carried by another arm in operative position relative to the first-mentioned arm and electrode upon the exterior of the box, or the like.

To this end, a housing 20 is provided of such construction, height and material as is found convenient or advantageous. To one side of this housing 20 a rod or tube 21 is rigidly and permanently secured in any approved manner, as by the use of an elbow 22 at its lower end and an arm 23 at its upper end.

Upon this rod or tube 21 a T-coupling 24 is mounted to swing and slide. As shown more especially at Figure 4, this T-coupling 24 is split and a clamping bolt at 25 is provided for the purpose of clamping said coupling upon the tube 21 when said coupling is to remain stationary. At right angles to the tube 21 an arm 26 is also carried by said coupling and a bolt at 27 similarly employed for clamping said arm rigidly in connection with said coupling.

Upon the top of the housing 20 a fulcrum member 28 is erected having an arm 29 connected with a push rod 30, which, in turn, is connected with a foot pedal 31. The operation of the foot pedal 31 moves the arm 29 from full line to dotted position, as shown at Figure 1, a spring 32 being provided for the purpose of producing a yielding action. The fulcrum member 28 carries a fitting 33 clamping an arm 34 in the manner described for clamping the arm 26.

The arms 26 and 34 respectively carry electrodes 35 and 36 in such position that as the arms 29 and 34 are rocked upon the fulcrum member 28, one of these electrodes moves from and toward the other. No particular novelty in the electrodes 35 and 36 is claimed in the present invention, but incidentally connections 37 and 38 are shown at Figure 1 for supplying a cooling fluid to the electrodes. As such cooling means, however, forms no part of the present invention, the complete coupling of such conduits with the inlet conduit 39 is not shown.

At Figure 6 is shown in perspective an arm which may be either the arm 26 or 34. This arm is shown as slitted at 40 and 41 at opposite ends, with grooves 42 and 43 for accommodating the electrodes and clamping screws 44 and 45 for clamping said electrodes within either slitted end of said arm. It is obvious that the arms may thus be reversed, so that the electrodes may occupy the relation to such arms as indicated at Figures 1, 7 and 8, to facilitate reaching otherwise inaccessible points within a container, or the like.

Also either of said arms 26 or 34 may be rotated upon its own axis throughout a part of a revolution to positions indicated at Figures 10, 11 and 12, further facilitating the reaching of inaccessible points.

Under some conditions where a considerable amount of similar work is to be performed, instead of employing a single-point electrode upon either of the arms 26 or 34, an electrode as indicated at 46, having spaced extremities, may be employed upon either of said arms. When so used, it is found desirable to swing the arm 26 laterally to bring its single or its double electrode into operative position. For this purpose, a collar 47 is employed embracing the tube or rod 21 and clamped thereon by a clamping screw 48. When moved to the dotted position shown at 47' at Figure 1 it engages under the fitting 24 and supports said fitting, preventing its vertical movement upon said tube or rod. This collar 47 is provided with segmental slots 49 and 50 accommodating stops 51 and 52 respectively, which may be properly positioned by the adjusting screw 53 to limit the lateral swing of the arm 26 as the exigencies of work may make necessary or desirable. By employing this manner of supporting and lateral limitation of movement, the arm 26 may swing as indicated at Figures 13 and 14, so that at either limit of its swinging movement, the electrode or the ends of the electrode carried thereby are in proper position for co-action with the electrode or the ends of the electrode carried by the arm 34.

For the conservation of current and safety of use, a switch 54 is shown operated by the push rod 30. As no novelty is claimed for this switch, no attempt has been made to show a complete or detailed device. Also a transformer 55 is shown at Figure 1 connected through the arm 56 with the fitting 33 and also connected with the arm 23, whereby the transformed current is supplied to the arms 26 and 34.

Limiting screws 57 and 58 are provided for adjusting the throw of the arm 24 upon its fulcrum.

The device as disclosed in said drawing is adapted for such a great variety of uses that an explanation of its operation in all of its utilities would be voluminous. As one explanation, it might be assumed that it is to be operated for the spot welding of the bottom of a boiler. In this case the boiler may be placed over the arm 26 until the electrode 35 is in position at the bottom of the boiler where the spot welding is to be accomplished. By previously properly adjusting the arms 26 and 34 and the electrodes carried thereby to insure the proper registry of the electrodes, it will be obvious that after the work has been so placed in position the mere depression of the pedal 31 will cause the electrodes to approach each other into operative relation with the work interposed therebetween and the welding accomplished in the usual well-known manner. When the work to be welded consits of a box, for instance, having angles, a forked electrode, as shown at Figure 13 may be employed with a terminal of the electrode in either corner of the box. By merely swinging the arm 26 laterally, the extremities of this interior electrode are brought into position for co-acting with the electrode carried by the arm 34 and the welding accomplished.

What we claim is:

1. An electric spot welding machine comprising a fulcrumed arm and an arm spaced relative thereto and adapted to swing laterally, means clamping said arms but adapted to permit the rotation of said arms upon their own axes, means to limit the movement of the swinging movement to position the extremities in operative relation to each other, electrodes carried at the extremities of said arms, and manual means for moving said arms into operative relation.

2. An electric spot welding machine comprising an upright support, a cylindrical member rigidly secured to the support, an arm carried by the cylindrical member adapted to be adjusted vertically upon said cylindrical member and to freely swing laterally about said cylindrical member as an axis, means to electively restrain the swinging action upon said cylindrical member, an arm pivoted in spaced relation to said adjustable arm, electrodes carried at the extremities of said arms, and manual means for moving said pivoted arm to bring said electrodes into operative relation.

3. An electric spot welding machine comprising a support, a cylindrical member mounted rigidly upon the support, a fitting carried by the cylindrical member, means to vertically adjustably support said fitting to permit lateral movement relative to the cylindrical member, means to electively clamp said fitting rigidly at an acquired adjustment, an arm carried by and extending laterally from said fitting and adapted to rotate in said fitting upon its own axis, means for clamping said arm rotatively in said fitting, a second arm fulcrumed on said support in spaced relation to said first-mentioned arm, electrodes carried at the extremities of said arms, and manual means for moving said fulcrumed arms to bring said electrodes into operative relation.

4. An electric spot welding machine comprising a supporting structure, an arm extending laterally from said supporting structure, a member fulcrumed upon said supporting structure, an arm reversibly carried by said fulcruming member adapted to rotate relative to said fulcruming member and upon its own axis, different electrode-clamping means at opposite ends of said reversible arm, means to clamp either end of said arm rigid relative to said clamping member, electrodes carried at the extremities of said arms, and manual means for moving said fulcruming member and arm carried thereby to bring said electrodes into operative relation.

5. An electric spot welding machine comprising a supporting structure, a guide carried rigidly by said supporting structure, a fitting slidable and rotatable upon said guide, a member fulcrumed upon said supporting structure, arms inserted in said fitting and said fulcruming member and extending laterally therefrom in spaced relation and proportioned to be reversed in said fitting and fulcruming member, different electrode-clamping means at opposite ends of said arms, electrodes carried electively by said clamping means, and manual means for moving said arms to bring said electrodes into operative relation.

6. An electric spot welding machine comprising a supporting structure, a cylindrical member carried rigidly by said supporting structure upon a vertical axis, a collar mounted to slide vertically upon said cylindrical member, means to clamp said collar at a vertically adjusted position, stops carried by said collar, an arm mounted to swing upon said cylindrical member and be supported by said collar and its movement limited by said stops, a second arm, means to move said second arm manually relative to the first mentioned arm, and electrodes carried at the extremities of said arms.

7. An electric spot welding machine comprising a supporting structure, a vertically positioned cylindrical member carried rigidly by said supporting structure, a collar mounted to slide vertically upon said cylindrical member, means to clamp said collar rigidly at an elected vertical adjustment on said cylindrical member, said collar being provided with arcuate slots, stops slidably mounted in said slots, means to rigidly secure said stops at adjusted positions, an arm mounted to swing freely upon said cylindrical member and bear upon said collar and its swinging motion limited by said stops, a second arm fulcrumed upon the supporting structure, means to move said second arm manually to approach the first mentioned arm, and electrodes carried at the extremities of said arms in position for co-action when said swinging arm is in engagement with one of said limiting stops.

In testimony whereof we hereunto affix our signatures.

FRANK M. CUSHING.
WILLIAM L. B. CUSHING.